(12) United States Patent
Sato et al.

(10) Patent No.: US 11,509,023 B2
(45) Date of Patent: Nov. 22, 2022

(54) BATTERY WIRING MODULE

(71) Applicant: Sumitomo Wiring Systems, Ltd., Mie (JP)

(72) Inventors: Hiroshi Sato, Mie (JP); Ryota Mori, Mie (JP); Hisayoshi Yaita, Mie (JP); Masami Suzuki, Mie (JP); Maya Nakasuka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 173 days.

(21) Appl. No.: 16/991,605

(22) Filed: Aug. 12, 2020

(65) Prior Publication Data

US 2021/0066695 A1 Mar. 4, 2021

(30) Foreign Application Priority Data

Aug. 29, 2019 (JP) .............................. JP2019-156995

(51) Int. Cl.
| | | |
|---|---|---|
| *H01M 10/00* | (2006.01) | |
| *H01M 50/502* | (2021.01) | |
| *H01M 10/48* | (2006.01) | |
| *H01M 10/42* | (2006.01) | |
| *H01R 11/28* | (2006.01) | |

(Continued)

(52) U.S. Cl.
CPC ....... *H01M 50/502* (2021.01); *H01M 10/425* (2013.01); *H01M 10/482* (2013.01); *H01M 50/20* (2021.01); *H01M 50/543* (2021.01); *H01R 11/288* (2013.01); *H01M 2220/20* (2013.01)

(58) Field of Classification Search
CPC ............ H01M 50/502; H01M 10/425; H01M 10/482; H01M 50/20; H01M 50/543; H01M 2220/20; H01M 50/298; H01M 50/507; H01M 50/557; H01M 50/209; H01R 11/288; Y02E 60/10
See application file for complete search history.

(56) References Cited

U.S. PATENT DOCUMENTS 9,825,272 B2 * 11/2017 Shitamichi .......... H01M 10/482
10,763,616 B2 * 9/2020 Shimizu ............... H01R 13/516
(Continued)

FOREIGN PATENT DOCUMENTS

JP 2015-002164 1/2015

*Primary Examiner* — Nicholas P D'Aniello
(74) *Attorney, Agent, or Firm* — Greenblum & Bernstein, P.L.C.

(57) ABSTRACT

Provided is a battery wiring module that allows module-side terminals to be easily mounted to a housing. The battery wiring module includes module-side terminals that are electrically connected to bus bars connecting battery terminals of a plurality of battery cells; wires with ends on one side connected to the module-side terminals; and a housing for accommodating the wires and the module-side terminals. The housing includes a plurality of terminal accommodating portions for accommodating the module-side terminals. The terminal accommodating portions include insertion ports into which the module-side terminals are partially inserted, and recesses that are located upstream of the insertion ports in a direction in which the module-side terminals are inserted and that are lower than terminal seat surfaces on which the module-side terminals can be placed.

6 Claims, 5 Drawing Sheets

(51) Int. Cl.
    *H01M 50/20*        (2021.01)
    *H01M 50/543*       (2021.01)

(56) References Cited

U.S. PATENT DOCUMENTS

| | | | | |
|---|---|---|---|---|
| 10,957,893 B2* | 3/2021 | Shimoda | ............. | H01M 50/569 |
| 2004/0043662 A1* | 3/2004 | Abazaraia | ............ | H01R 13/719 |
| | | | | 439/620.09 |
| 2014/0287622 A1* | 9/2014 | Kinoshita | ........... | H01M 50/543 |
| | | | | 439/595 |
| 2014/0315441 A1* | 10/2014 | Kinoshita | ............. | H01M 50/20 |
| | | | | 439/627 |
| 2016/0197330 A1* | 7/2016 | Takase | ................ | H01M 50/528 |
| | | | | 429/92 |

* cited by examiner

BATTERY WIRING MODULE

TECHNICAL FIELD

The present disclosure relates to a battery wiring module.

BACKGROUND ART

For example, as disclosed in JP 2015-2164A, a battery wiring module is attached to a high-voltage secondary battery that is mounted as a power source for travelling via driving in a vehicle such as an electric automobile or a hybrid automobile. In the battery wiring module, module-side terminals are connected to bus bars that connect a plurality of battery cells constituting the secondary battery.

JP 2015-2164A is an example of related art.

SUMMARY OF THE INVENTION

Meanwhile, it is conceivable that, in order to restrict the movement of the module-side terminals relative to a housing in a battery wiring module such as the one described above, the module-side terminals are partially inserted into holes or depressions formed in the housing. However, when mounting the module-side terminals with portions thereof inserted into the holes, depressions or the like of the housing, the portions of the module-side terminals that are to be inserted may come into contact around the holes, depressions or the like of the housing, which leaves room for improvement in mounting.

An object of the present disclosure is to provide a battery wiring module that allows module-side terminals to be easily mounted to a housing.

A battery wiring module according to the present disclosure includes: module-side terminals that are electrically connected to bus bars connecting battery terminals of a plurality of battery cells; wires with ends on one side connected to the module-side terminals; and a housing for accommodating the wires and the module-side terminals, wherein the housing includes a plurality of terminal accommodating portions for accommodating the module-side terminals, and the terminal accommodating portions include insertion ports into which the module-side terminals are partially inserted, and recesses that are located upstream of the insertion ports in a direction in which the module-side terminals are inserted and that are lower than terminal seat surfaces on which the module-side terminals can be placed.

With the battery wiring module according to the present disclosure, module-side terminals can be easily mounted to a housing.

EMBODIMENTS OF THE INVENTION

Figure 1:
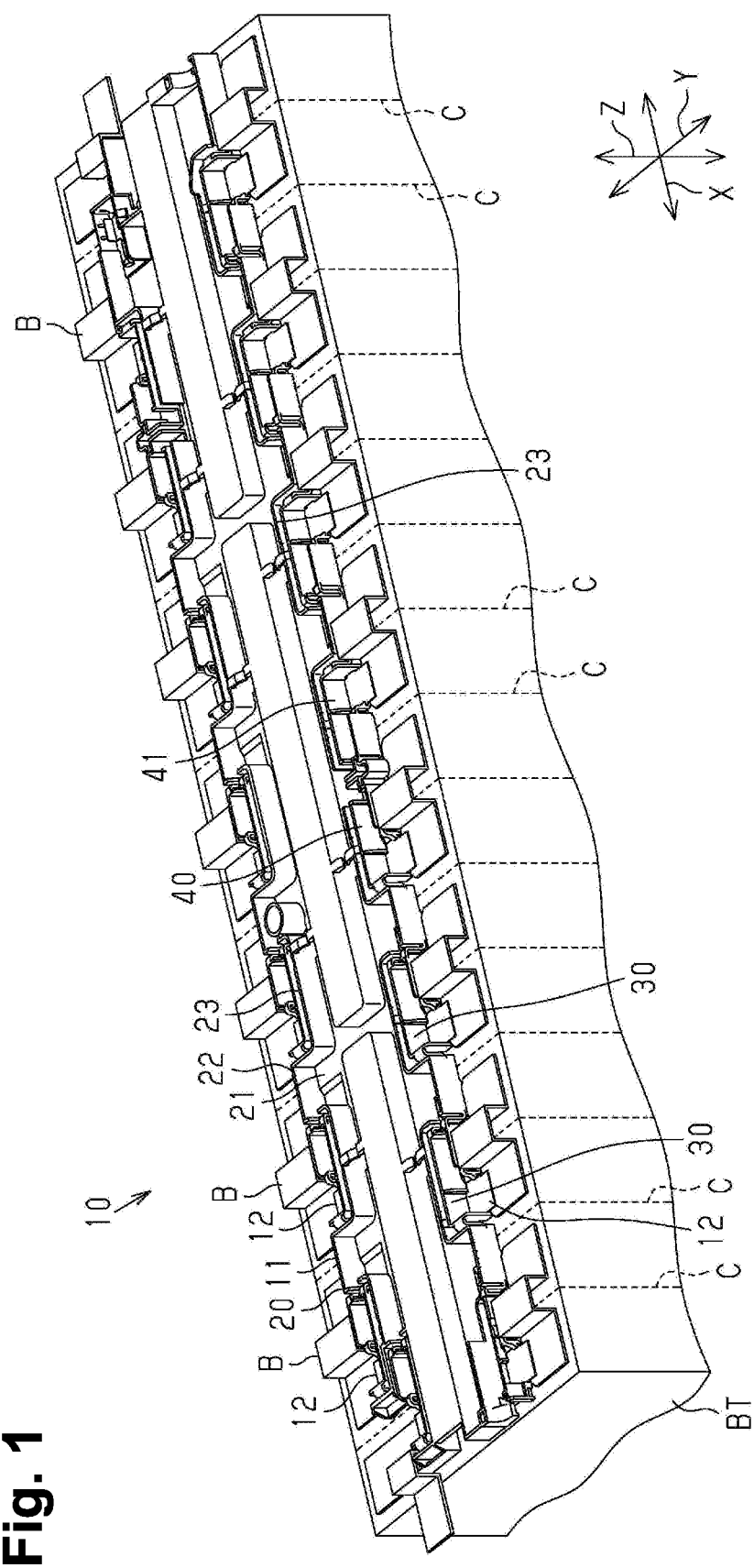
FIG. 1 is a perspective view of a battery wiring module according to an embodiment.

Description of Embodiments of the Present Disclosure

First, embodiments of the present disclosure will be listed and described.

A battery wiring module according to the present disclosure includes:

[1] module-side terminals that are electrically connected to bus bars connecting battery terminals of a plurality of battery cells; wires with ends on one side connected to the module-side terminals; and a housing for accommodating the wires and the module-side terminals, wherein the housing includes a plurality of terminal accommodating portions for accommodating the module-side terminals, and the terminal accommodating portions include insertion ports into which the module-side terminals are partially inserted, and recesses that are located upstream of the insertion ports in a direction in which the module-side terminals are inserted and that are lower than terminal seat surfaces on which the module-side terminals can be placed.

With this configuration, the recesses that are lower than the terminal seat surfaces are provided upstream in the insertion direction of the insertion ports, and thus the circumferences of the insertion ports are widened. Accordingly, it is possible to restrain the module-side terminals from coming into contact around the insertion ports when the module-side terminals are partially inserted into the insertion ports. This allows the module-side terminals to be easily mounted to the housing.

[2] It is preferable that the battery wiring module includes inclined surfaces that are inclined from the terminal seat surfaces to the insertion ports.

With this configuration, the inclined surfaces are provided, and thus the module-side terminals can be guided to the insertion ports. Accordingly, the module-side terminals can be easily mounted to the housing.

[3] It is preferable that the insertion ports are each formed from a side wall to a bottom surface of the terminal accommodating portion.

With this configuration, the insertion ports are formed from the side walls to the bottom surfaces of the terminal accommodating portions, and thus the opening amounts of the insertion ports themselves can be increased. Accordingly, the module-side terminals can be easily mounted to the housing.

[4] It is preferable that the recesses each have a plate thickness greater than or equal to the smallest plate thickness of the terminal seat surface.

With this configuration, the plate thickness of each of the recesses is greater than or equal to the smallest plate thickness of the terminal seat surface, and thus the strength of the recess can be kept at about the same level as that of the terminal seat surface.

[5] It is preferable that the module-side terminals each include a first terminal and a second terminal, the first terminal includes a first terminal body portion that is connected to the bus bar, and a first inserted portion that extends from the first terminal body portion and that is inserted into the insertion port, the second terminal includes a second terminal body portion that is connected to the bus bar, and a second inserted portion that extends from the second terminal body portion and that is inserted into the insertion port, the first inserted portion is formed extending from a position eccentric toward a center of an end portion of the first terminal body portion, and the second inserted portion is formed extending from a position eccentric toward a side edge of an end portion of the second terminal body portion, and has a width different from that of the first inserted portion.

With this configuration, the first inserted portion and the second inserted portion differ from each other in their formation positions and their widths in the terminal body portions. Accordingly, it is possible to reduce erroneous mounting between the first inserted portion and the second inserted portion.

[6] It is preferable that the terminal accommodating portions each include a first terminal accommodating portion corresponding to the first terminal, and a second terminal accommodating portion corresponding to the second terminal, the first terminal accommodating portion includes a first insertion port into which the first inserted portion is inserted, the second terminal accommodating portion includes a second insertion port into which the second inserted portion is inserted, and one of the first insertion port and the second insertion port has an opening having a width larger than that of one of the first inserted portion and the second inserted portion that corresponds thereto, and has an opening having a width smaller than that of the other one of the first inserted portion and the second inserted portion that does not correspond thereto.

With this configuration, the first insertion port and the second insertion port have different widths, and the other one of the first insertion port and the second insertion port has an opening having a width smaller than that of the inserted portion that does not correspond thereto. Accordingly, it is possible to reduce erroneous mounting such as insertion of the non-corresponding inserted portion.

Details of Embodiments of the Present Disclosure

Specific examples of the battery wiring module according to the present disclosure will be described below with reference to the drawings. In the drawings, parts of configurations are shown exaggerated or simplified in some cases for convenience of description. Also, dimensional proportions of the portions may be different from the actual dimensional proportions in the drawings. Being "parallel" or "orthogonal" as used herein includes not only being exactly parallel or orthogonal, but also being substantially parallel or orthogonal, as long as the operations and effects of the present embodiment can be achieved. It should be noted that the present invention is not limited to these examples, and is intended to include all modifications which fall within the scope of the claims and the meaning and scope of equivalents thereof.

As shown in FIG. 1, the battery wiring module 10 is attached to a cuboid-shaped secondary battery BT. The secondary battery BT is mounted in an electric automobile, a hybrid automobile, or the like. The secondary battery BT supplies power to a travel motor of the vehicle. Also, the secondary battery BT receives a supply of power from the travel motor or a power generation motor according to the charging state or the driving state of the vehicle.

The secondary battery BT includes a plurality of battery cells C, and positive electrode terminals and negative electrode terminals (not shown) of the battery cells C face the battery wiring module 10 (upward). The plurality of battery cells C are disposed aligned in one direction. In the following description, among the three directions that are orthogonal to each other in FIG. 1, namely, the X direction, the Y direction, and the Z direction, the X direction is the direction in which the battery cells C are aligned, the Z direction is the vertical direction, which is one of the directions orthogonal to the X direction and is the attaching direction (stacking direction) of the battery wiring module 10 and the secondary battery BT, and the Y direction is the direction orthogonal to the X direction and the Z direction. Also, upward is the side on which the battery wiring module 10 is attached to the secondary battery BT. That is, the battery wiring module 10 is attached above the secondary battery BT.

Each battery cell C is cuboid-shaped, for example, and is provided with a positive electrode terminal and a negative electrode terminal on its upper surface, which is located on the battery wiring module 10 side. Note that the positive electrode terminal and the negative electrode terminal are spaced apart from each other in the Y direction on the upper surface. At this time, the battery cells C are aligned, with the orientations of the battery cells C being alternatingly inverted, such that the positive electrode terminals and the negative electrode terminals are alternatingly aligned in the direction in which the battery cells C are aligned, that is the X direction. Accordingly, two rows of the positive electrode terminals and the negative electrode terminals are formed in which the positive electrode terminals and the negative electrode terminals are alternatingly aligned in the X direction.

The terminals are provided with bus bars B that connect the adjacent terminals, that is, the positive electrode terminal and the negative electrode terminal. The bus bars B connect the battery terminals that are adjacent in the X direction, that is, the positive electrode terminal and the negative electrode terminal that are adjacent in the X direction. Accordingly, the battery cells C are connected in series by the bus bars B. The bus bars B of the present example are connected through welding to the positive electrode terminals and the negative electrode terminals of the battery cells C, for example.

Figure 3:
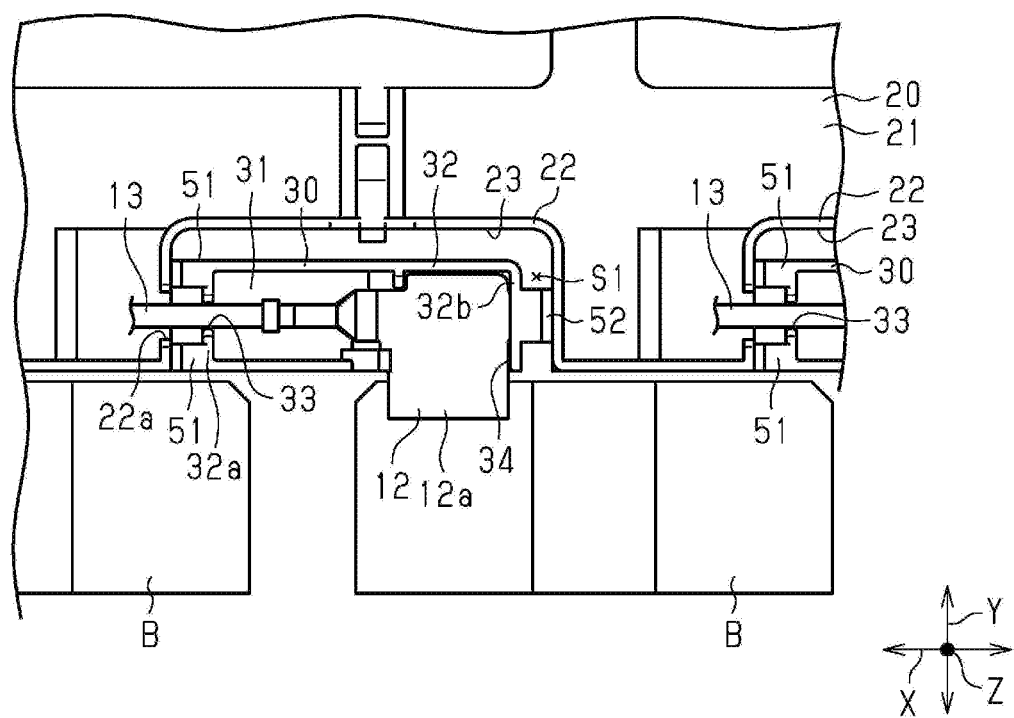
FIG. 3 is a top view showing a portion of the battery wiring module according to the embodiment.
Figure 4:
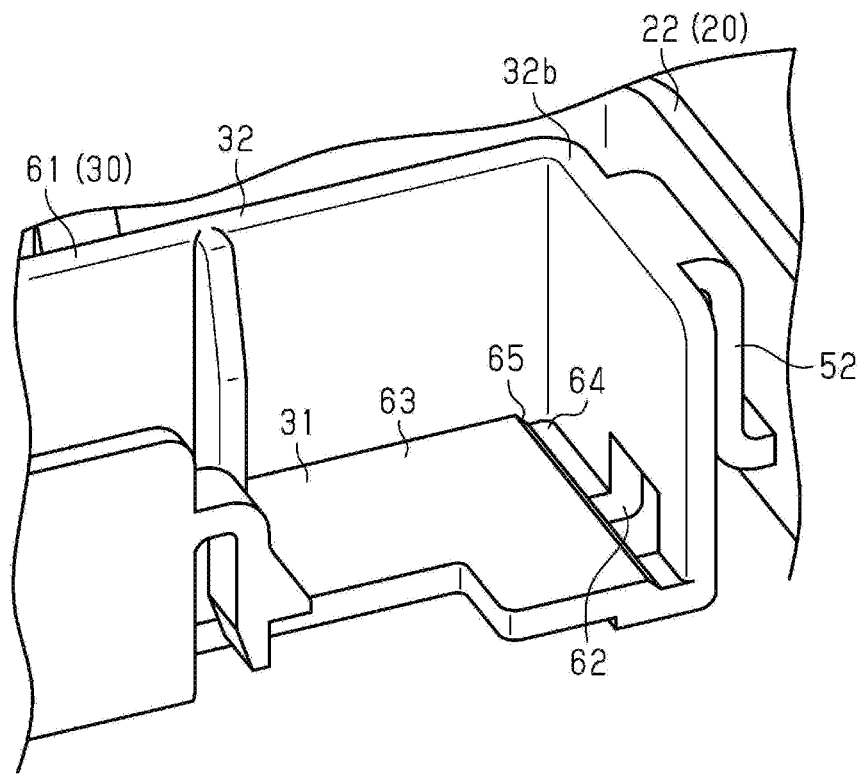
FIG. 4 is a perspective view of a first terminal accommodating portion according to the embodiment.
Figure 5:
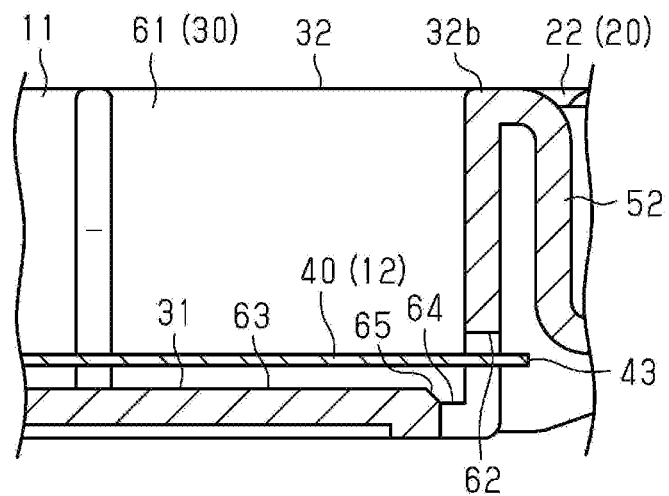
FIG. 5 is a cross-sectional view of the first terminal accommodating portion and a first terminal according to the embodiment.
Figure 6:
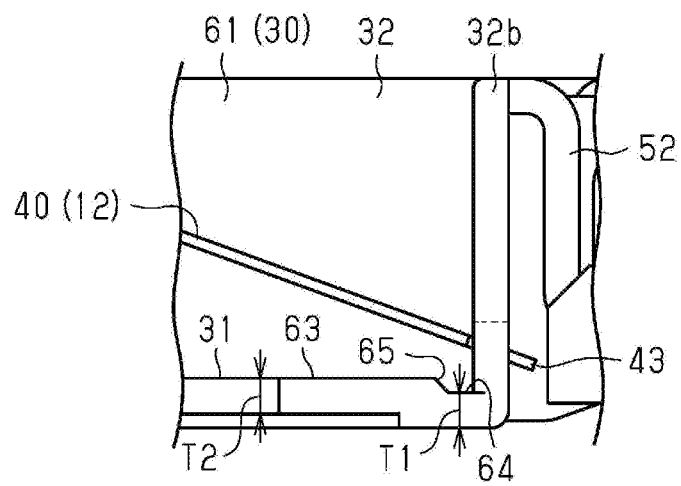
FIG. 6 is a side view of the first terminal accommodating portion and the first terminal according to the embodiment.
Figure 7:
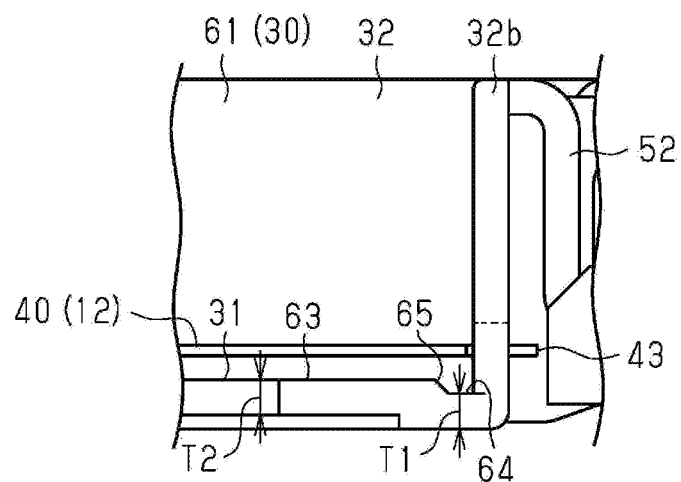
FIG. 7 is a side view of the first terminal accommodating portion and the first terminal according to the embodiment.

As shown in FIG. 1, the battery wiring module 10 includes a housing 11, a plurality of module-side terminals 12, and a plurality of wires 13 (see FIG. 3).

The housing 11 has a shape whose dimension in the X direction, which is the direction in which the battery cells C are aligned, is larger than its dimension in the Y direction, which is the width direction, for example. The housing 11 has a shape with an opening formed on its upper side, and at least a part of the opening is closed by a cover (not shown).

The housing 11 is constituted by an insulating resin member, for example. The housing 11 includes a wire accommodating portion 20 for accommodating wires 13, and terminal accommodating portions 30 for accommodating the module-side terminals 12.

The module-side terminals 12 of the present embodiment each include a first terminal 40 and a second terminal 45.

Figure 8:
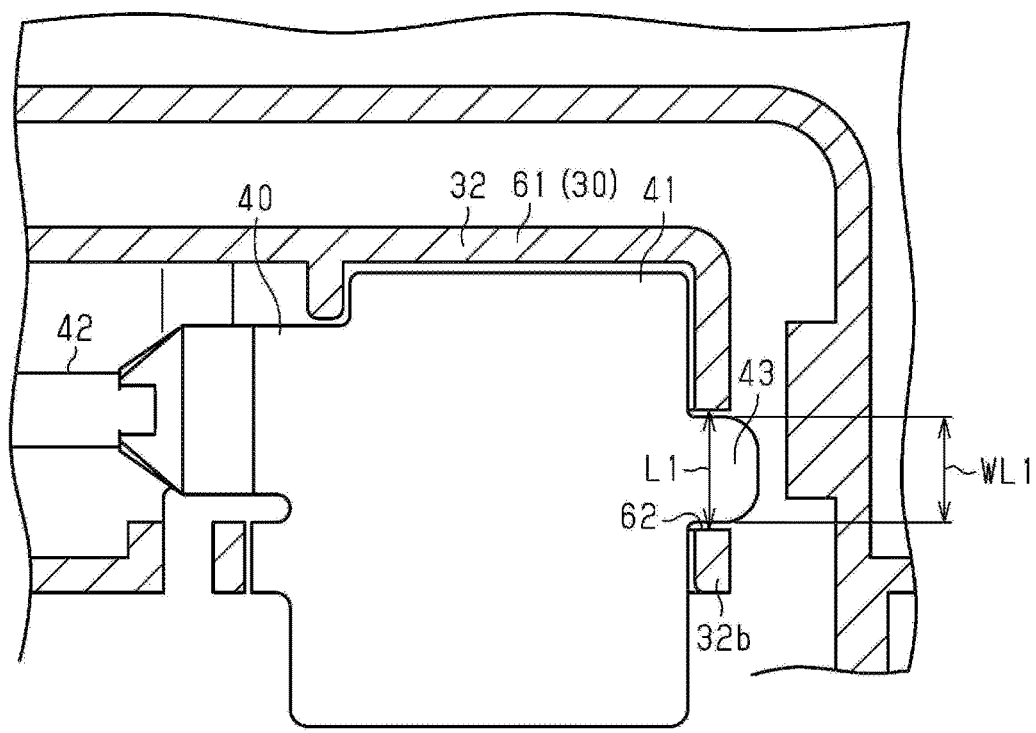
FIG. 8 is a cross-sectional view showing the first terminal accommodating portion and the first terminal according to the embodiment.

As shown in FIG. 8, the first terminal 40 includes a square plate-shaped first terminal body portion 41, and a barrel portion 42 extending from the first terminal body portion 41 and connected to an end of the wire 13. The barrel portion 42 is electrically connected to the core wire of the wire 13.

The first terminal 40 includes an extension portion 43 extending from the first terminal body portion 41 and serves as an inserted portion. The extension portion 43 extends in a direction in which the terminal body portion 41 and the barrel portion 42 are aligned, from the side opposite to that of the barrel portion 42 of the first terminal body portion 41. More specifically, the extension portion 43 extends along the X direction in a state in which the first terminal 40 is accommodated in the terminal accommodating portion 61.

The extension portion 43 has a width smaller than that of the first terminal body portion 41. More specifically, the length in the Y direction of the extension portion 43 in a state in which the first terminal 40 is accommodated in the terminal accommodating portion 30 is smaller than the length in the Y direction of the first terminal body portion 41.

Figure 9:
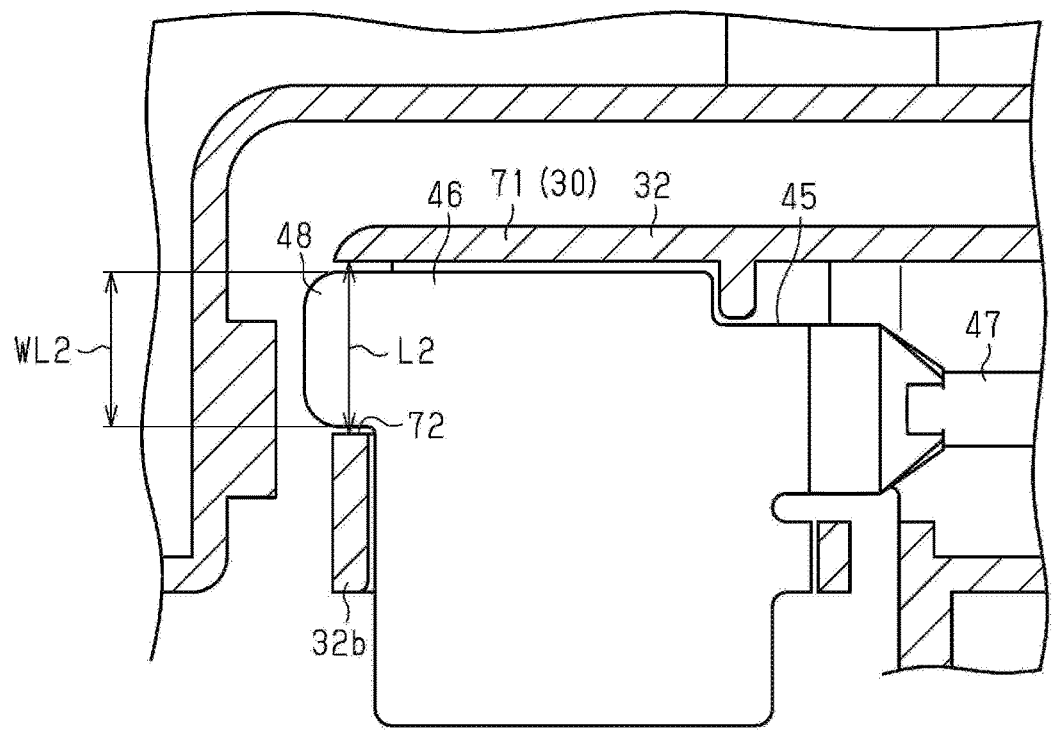
FIG. 9 is a cross-sectional view showing a second terminal accommodating portion and a second terminal according to the embodiment.

As shown in FIG. 9, the second terminal 45 includes a square plate-shaped second terminal body portion 46, and a barrel portion 47 extending from the second terminal body portion 46 and connected to an end of the wire 13. The barrel portion 47 is electrically connected to the core wire of the wire 13.

The second terminal 45 includes an extension portion 48 extending from the second terminal body portion 46 and serves as an inserted portion. The extension portion 48 extends in a direction in which the second terminal body portion 46 and the barrel portion 47 are aligned, from the side opposite to that of the barrel portion 47 of the second terminal body portion 46. More specifically, the extension portion 48 extends along the X direction in a state in which the first terminal 40 is accommodated in the terminal accommodating portion 30.

The extension portion 48 has a width smaller than that of the second terminal body portion 46. More specifically, in a state in which the second terminal 45 is accommodated in the terminal accommodating portion 30, the length in the Y direction of the extension portion 48 is smaller than the length in the Y direction of the second terminal body portion 46.

As shown in FIGS. 8 and 9, the width of the extension portion 43 of the first terminal 40 is different from the width of the extension portion 48 of the second terminal 45. More specifically, the width direction length WL1 of the extension portion 43 is smaller than the width direction length WL2 of the extension portion 48. That is, the extension portion 43 of the first terminal 40 and the extension portion 48 of the second terminal 45 have different sizes.

The extension portion 43 extends from a position eccentric toward the center of an end portion of the first terminal body portion 41. The extension portion 48 extends from a position eccentric toward the side edge of an end portion of the second terminal body portion 46.

Figure 2:
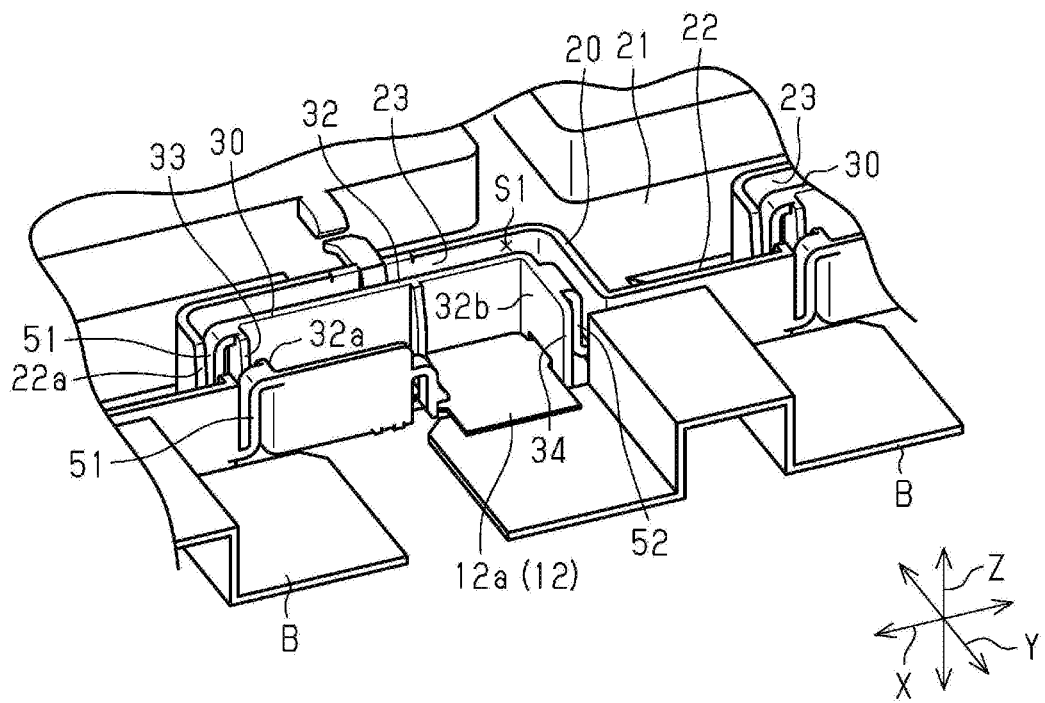
FIG. 2 is a perspective view showing a portion of the battery wiring module according to the embodiment.

As shown in FIGS. 1 to 3, the wire accommodating portion 20 of the housing 11 is demarcated in the housing 11 by a bottom portion 21 and side walls 22 extending from the outer edge portions of the bottom portion 21. In the X direction, the wire accommodating portion 20 includes a plurality of recesses 23 that are recessed in a direction that is orthogonal to the direction in which the plurality of battery cells C are aligned and that is orthogonal to the stacking direction of the housing 11 on the battery cells C, that is, the Y direction. A terminal accommodating portion 30 is located in each recess 23.

As shown in FIGS. 2 and 3, the terminal accommodating portions 30 of the housing 11 are demarcated in the housing 11 by bottom portions 31 and side walls 32 extending from the outer edge portions of the bottom portions 31. The terminal accommodating portions 30 are formed so as to have approximately cuboid shapes that are longer in the X direction. The recesses 23 of the terminal accommodating portions 30 and the wire accommodating portion 20 are provided with gaps S1 on both sides in the X direction and one side in the Y direction of the terminal accommodating portions 30. Also, the side walls 32 of the terminal accommodating portions 30 each include an opening portion 33 that is open in the X direction, and an opening portion 34 that is open in the Y direction, which is orthogonal to the X direction.

As shown in FIGS. 2 and 3, in the X direction, the opening portion 33 that is open in the X direction of the terminal accommodating portion 30 opposes an opening portion 22a that is formed so as to be open on the side wall 22 of the wire accommodating portion 20. For this reason, the wire 13 connected to the module-side terminal 12 accommodated in the terminal accommodating portion 30 can be guided into the wire accommodating portion 20 using the opening portion 33 of the terminal accommodating portion 30 and the opening portion 22a of the wire accommodating portion 20. That is, the opening portion 33 of the terminal accommodating portion 30 and the opening portion 22a of the wire accommodating portion 20 function as openings for guiding (inserting) the wire 13.

As shown in FIGS. 2 and 3, the opening portion 34 is open to the outside (the side opposite to that of the wire accommodating portion 20) in the Y direction. The opening portion 34 can expose part of the terminal main body 12a of the module-side terminal 12 accommodated in the terminal accommodating portion 30 to the outside in the Y direction. The exposed portion of the terminal main body 12a that is partially exposed from the opening portion 34 is electrically connected to the bus bar B.

As shown in FIGS. 2 and 3, elastic joining portions 51 and 52 are included between the wire accommodating portion 20 and the terminal accommodating portion 30. The elastic joining portions 51 and 52 are provided on both sides in the X direction of the terminal accommodating portion 30, with the terminal accommodating portion 30 interposed therebetween. Two elastic joining portions 51 are provided on both sides in the Y direction of the opening portion 33 on the opening portion 33 side, which is one side in the X direction of the terminal accommodating portion 30. One elastic joining portion 52 is provided on the other side in the X direction of the terminal accommodating portion 30. The elastic joining portions 51 and 52 are formed so as to have an approximate S shape in a view from the Y direction. Accordingly, the elastic joining portions 51 and 52 more easily elastically deform in the X direction. In the present embodiment, the elastic joining portion 51 connects the lower portions of the side walls 22 on both sides of the opening portion 22a of the wire accommodating portion 20 and the upper portions of side walls 32a on both sides of the opening portion 33 of the terminal accommodating portion 30. The elastic joining portion 52 connects the upper portion of a side wall 32b of the side walls 32 that opposes the opening 33 in the X direction, and the lower portion of an area of the side wall 22 of the wire accommodating portion 20 that opposes the side wall 32b in the X direction. Then, with the elastic joining portions 51 and 52, when the terminal accommodating portion 30 moves in the Y direction relative to the wire accommodating portion 20, the elastic joining portions 51 and 52 elastically deform.

As shown in FIGS. 8 and 9, the terminal accommodating portions 30 of the present embodiment each include a first terminal accommodating portion 61 corresponding to the first terminal 40 and a second terminal accommodating portion 71 corresponding to the second terminal 45.

As shown in FIG. 8, the first terminal accommodating portion 61 includes an insertion port 62 into which the extension portion 43 of the first terminal 40 can be inserted.

As shown in FIGS. 4 to 7, the insertion port 62 is formed from the side wall 32b to the bottom portion 31. The insertion port 62 of the present embodiment is a through hole, through which the extension portion 43 of the first terminal 40 is passed. Note that the insertion port 62 is not limited to a through hole, and may be a depression.

The insertion port 62 is formed in a lower portion of the side wall 32b, and interference with the elastic joining portion 52 is thus reduced.

The bottom portion 31 of the first terminal accommodating portion 61 includes a terminal seat surface 63 on which the first terminal 40 can be placed, and a recess 64 that is lower than the terminal seat surface 63. The recess 64 is formed in the bottom portion 31 so as to surround the insertion port 62. That is, the recess 64 is formed around the insertion port 62. Also, the first terminal accommodating portion 61 has an inclined surface 65 that is inclined from the terminal seat surface 63 to the insertion port 62.

The plate thickness T1 of the recess 64 is greater than or equal to the smallest plate thickness T2 of the terminal seat surface 63.

As shown in FIG. 9, the second terminal accommodating portion 71 includes an insertion port 72 into which the extension portion 48 of the second terminal 45 can be inserted. The insertion port 72 is formed from the side wall 32b to the bottom portion 31, as in the case of the insertion port 62. The insertion port 72 of the present embodiment is a through hole, through which the extension portion 48 of the second terminal 45 is passed. Note that the insertion port 72 is not limited to a through hole, and may be a depression. Although not shown, a recess 64 is formed in the second terminal accommodating portion 71, as in the case of the first terminal accommodating portion 61. The recess 64 of the second terminal accommodating portion 71 has the same configuration as that of the recess 64 of the first terminal accommodating portion 61.

As shown in FIGS. 8 and 9, the insertion port 72 of the second terminal accommodating portion 71 differs from the insertion port 62 of the first terminal accommodating portion 61 in its width in the Y direction and its formation position in the Y direction. More specifically, the width direction length L1 of the insertion port 62 of the first terminal accommodating portion 61 is smaller than the width direction length L2 of the insertion port 72 of the second terminal accommodating portion 71. The width direction length L1 of the insertion port 62 of the first terminal accommodating portion 61 is larger than the width direction length WL1 of the extension portion 43 of the corresponding first terminal 40, and is smaller than the width direction length WL2 of the extension portion 48 of the non-corresponding second terminal 45. Accordingly, through the insertion port 62 of the first terminal accommodating portion 61, the extension portion 43 of the first terminal 40 can be passed, but the extension portion 48 of the second terminal 45 cannot. Although the width direction length WL1 of the extension portion 43 of the first terminal 40 is smaller than the width direction length L2 of the insertion port 72 of the second terminal accommodating portion 71, the extension portion 43 cannot be passed through the insertion port 72 when the first terminal body portion 41 of the first terminal 40 is disposed along the side wall 32.

The operation of the present embodiment will be described.

The battery wiring module 10 of the present embodiment is disposed on the secondary battery BT that includes a plurality of battery cells C. The module-side terminals 12 of the battery wiring module 10 are connected to the bus bars B that connect the positive electrode terminals and the negative electrode terminals of the battery cells C that are aligned in the X direction. The ends on one side of the wires 13 are connected to the module-side terminals 12, and the ends on the other side of the wires 13 are connected to battery monitoring ECUs (not shown). The battery monitoring ECUs can monitor the voltages of the battery cells C.

On the upstream side in the insertion direction of the insertion ports 62 and 72, the terminal accommodating portions 61 and 71 include the recesses 64 that are lower than the terminal seat surfaces 63, and the circumferences of the insertion ports 62 and 72 are thus widened.

The effects of the present embodiment will be described.

(1) The recesses 64 that are lower than the terminal seat surfaces 63 are provided upstream in the insertion direction of the insertion ports 62 and 72, and thus the circumferences of the insertion ports 62 and 72 are widened. Accordingly, it is possible to restrain the module-side terminals 12 from coming into contact around the insertion ports 62 and 72 when the module-side terminals 12 are partially inserted into the insertion ports 62 and 72. This allows the module-side terminals 12 to be easily mounted to the housing 11.

(2) The inclined surfaces 65 are provided, and thus the module-side terminals 12 can be guided to the insertion ports 62 and 72. Accordingly, the module-side terminals 12 can be easily mounted to the housing 11.

(3) The insertion ports 62 and 72 are formed from the side walls 32b of the terminal accommodating portions 61 and 71 to the bottom portions 31 serving as the bottom surfaces, and thus the opening amounts of the insertion ports 62 and 72 themselves can be increased. Accordingly, the module-side terminals 12 can be easily mounted to the housing 11.

(4) The plate thicknesses T1 of each of the recesses 64 is greater than or equal to the smallest plate thickness T2 of the terminal seat surface 63, and thus the strength of the recess 64 can be kept at about the same level as that of the terminal seat surface 63.

(5) The extension portion 43 serving as the first inserted portion and the extension portion 48 serving as the second inserted portion differ from each other in their formation positions and their widths in the terminal body portions 41 and 46. Accordingly, it is possible to reduce erroneous mounting between the extension portion 43 and the extension portion 48.

(6) The insertion port 62 and the insertion port 72 have different widths, and the insertion port 62 has an opening having a width smaller than that of the non-corresponding extension portion 48. Accordingly, it is possible to reduce erroneous mounting such as insertion of the non-corresponding extension portion 48 into the insertion port 62.

Other Embodiments

Note that the above-described embodiment can be implemented with the following modifications. The above-described embodiment and the following modifications can be implemented in combination with each other as long as there are no technical discrepancies.

In the above-described embodiment, a configuration is employed that includes the inclined surfaces 65 that are inclined from the terminal seat surfaces 63 to the insertion ports 62 and 72; however, steps may be employed.

In the above-described embodiment, a configuration is employed in which the insertion ports 62 and 72 are formed from the side walls 32b to the bottom portions 31; however, the insertion ports 62 and 72 may be formed only in the side walls 32b.

In the above-described embodiment, the plate thickness T1 of the recess 64 and the smallest plate thickness T2 of the terminal seat surface 63 are the same; however, the plate thickness T1 may be larger than the plate thickness T2, or the plate thickness T1 may be smaller than the plate thickness T2.

In the above-described embodiment, a configuration is employed in which the first terminal 40 and the second terminal 45 have different width direction lengths WL1 and WL2 of the extension portions 43 and 48; however, the width direction lengths WL1 and WL2 may be the same. In this case, for example, the width direction lengths L1 and L2 of the insertion ports 62 and 72 may be the same.

In the above-described embodiment, a configuration is employed in which the extension portions 43 and 48 serving as the inserted portions extend in the direction in which the terminal body portions 41 and 46 and the barrel portions 42 and 47 are aligned; however, the present disclosure is not limited thereto.

In the above-described embodiment, a configuration is employed that includes the first terminal 40 and the second terminal 45 as the module-side terminals 12; however, the present disclosure is not limited thereto. It is possible to employ a configuration that uses only one of the first terminal 40 and the second terminal 45. In this case, the insertion port into which the extension portion serving as the inserted portion is inserted is formed at a position matching that of the extension portion of the corresponding terminal.

In the above-described embodiment, a configuration is employed in which the extension portions 43 and 48 having widths smaller than those of the terminal body portions 41 and 46 extend from the terminal body portions 41 and 46; however, the present disclosure is not limited thereto. For example, it is possible to employ a configuration in which extension portions having widths comparable to those of the terminal body portions 41 and 46 are provided, and the extension portions are inserted into the insertion ports. It is also possible to employ a configuration in which the terminal body portions 41 and 46 themselves are inserted into the insertion ports.

In the above-described embodiment, a configuration is employed in which the terminal accommodating portions 30 are provided in the recesses 23; however, the present disclosure is not limited thereto. For example, it is possible to employ a configuration in which the recesses 23 are omitted. That is, it is possible to employ a configuration in which the terminal accommodating portions 30 protrude from the wire accommodating portions 20 in the Y direction.

The number of battery cells C that is disclosed in the above-described embodiment is merely an example, and may be changed as appropriate. Also, the number of module-side terminals and the number of wires may be changed as appropriate according to the number of battery cells.

In the above-described embodiment, the battery wiring module is attached to the secondary battery BT mounted in a vehicle; however, it is possible to employ a configuration in which the battery wiring module is attached to a battery mounted in an apparatus other than a vehicle.

LIST OF REFERENCE NUMERALS

10: Battery wiring module
11: Housing
12: Module-side terminal
12a: Terminal body
13: Wire
20: Wire accommodating portion
21: Bottom portion
22: Side wall
22a: Opening
23: Recess
30: Terminal accommodating portion
31: Bottom portion (bottom surface)
32: Side wall
32a: Side wall
32b: Side wall
33: Opening
34: Opening
40: First terminal
41: First terminal body portion
42: Barrel portion
43: Extension portion (first inserted portion)
45: Second terminal
46: Second terminal body portion
47: Barrel portion
48: Extension portion (second inserted portion)
51, 52: Elastic joining portion
61: First terminal accommodating portion
62: Insertion port (first insertion port)
63: Terminal seat surface
64: Recess
65: Inclined surface
71: Second terminal accommodating portion
72: Insertion port (second insertion port)
B: Bus bar
BT: Secondary battery
C: Battery cell
L1, L2: Width direction length
T1, T2: Plate thickness
WL1, WL2: Width direction length

What is claimed is:

1. A battery wiring module comprising:
module-side terminals that are electrically connected to bus bars, and the bus bars connect battery terminals of a plurality of battery cells;
wires with ends on one side connected to the module-side terminals; and
a housing to house the wires and the module-side terminals,
wherein the housing includes a plurality of terminal accommodating portions to house the module-side terminals,
the terminal accommodating portions include bottom portions and sidewalls extending from the bottom portions, and the terminal accommodating portions include insertion ports into which the module-side terminals are partially inserted, and recesses in the bottom portions that are located upstream of the insertion ports in a direction in which the module-side terminals are inserted and that are lower than terminal seat surfaces of the bottom portions on which the module-side terminals are placeable, perimeters of the recesses are disposed between the sidewalls and the terminal seat surfaces, surfaces of the bottom portions that form the recesses are in direct contact with the insertion ports and the terminal seat surfaces, and the recesses extend along an entire width of the terminal seat surfaces.

2. The battery wiring module according to claim 1, further comprising inclined surfaces that are inclined from the terminal seat surfaces to the insertion ports.

3. The battery wiring module according to claim 1, wherein the insertion ports are each formed from a side wall to a bottom surface of one of the terminal accommodating portions.

4. The battery wiring module according to claim 1, wherein the recesses each have a plate thickness greater than or equal to a smallest plate thickness of the terminal seat surfaces.

5. The battery wiring module according to claim 1, wherein the module-side terminals each include a first terminal and a second terminal, the first terminal includes a first terminal body portion that is connected to one of the bus bars, and a first inserted portion that extends from the first terminal body portion and that is inserted into one of the insertion ports, the second terminal includes a second terminal body portion that is connected to another one of the bus bars, and a second inserted portion that extends from the second terminal body portion and that is inserted into another one of the insertion ports, the first inserted portion is formed extending from a position eccentric toward a center of an end portion of the first terminal body portion, and the second inserted portion is formed extending from a position eccentric toward a side edge of an end portion of the second terminal body portion, and has a width different from that of the first inserted portion.

6. The battery wiring module according to claim 5, wherein the terminal accommodating portions each include a first terminal accommodating portion corresponding to the first terminal, and a second terminal accommodating portion corresponding to the second terminal, the first terminal accommodating portion includes a first insertion port into which the first inserted portion is inserted, the second terminal accommodating portion includes a second insertion port into which the second inserted portion is inserted, and one of the first insertion port and the second insertion port has an opening having a width larger than that of one of the first inserted portion and the second inserted portion that corresponds thereto, and has an opening having a width smaller than that of the other one of the first inserted portion and the second inserted portion that does not correspond thereto.

\* \* \* \* \*